US009148544B2

United States Patent
Dave et al.

(10) Patent No.: US 9,148,544 B2
(45) Date of Patent: Sep. 29, 2015

(54) SYSTEM, PROCESS, AND COMPUTER PROGRAM PRODUCT FOR IMPLEMENTING A DOCUMENT SCANNER IN A HAND-HELD DEVICE

(71) Applicant: NVIDIA Corporation, Santa Clara, CA (US)

(72) Inventors: Dhaval Sanjaykumar Dave, Ahmedabad (IN); Anup Ashok Dalvi, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 347 days.

(21) Appl. No.: 13/725,068

(22) Filed: Dec. 21, 2012

(65) Prior Publication Data

US 2014/0179370 A1 Jun. 26, 2014

(51) Int. Cl.
*H04N 1/107* (2006.01)
*H04M 1/21* (2006.01)
*H04N 1/21* (2006.01)

(52) U.S. Cl.
CPC ............. *H04N 1/107* (2013.01); *H04M 1/21* (2013.01); *H04N 1/21* (2013.01)

(58) Field of Classification Search
CPC ....... G06Q 10/10; G06Q 20/10; G06Q 40/00; G06Q 40/02; G06Q 50/18; G06Q 10/06; G06Q 10/107; G06Q 20/102
See application file for complete search history.

(56) References Cited

U.S. PATENT DOCUMENTS

| | | | |
|---|---|---|---|
| 6,249,360 B1 * | 6/2001 | Pollard et al. | 358/473 |
| 2005/0007343 A1 | 1/2005 | Butzer | |
| 2006/0040712 A1 | 2/2006 | Ansari et al. | |
| 2008/0096620 A1 | 4/2008 | Lee et al. | |
| 2010/0296129 A1 * | 11/2010 | Zahnert et al. | 358/449 |
| 2010/0296140 A1 * | 11/2010 | Zahnert et al. | 358/505 |
| 2011/0234497 A1 * | 9/2011 | Zahnert et al. | 345/166 |
| 2012/0284602 A1 * | 11/2012 | Seed et al. | 715/224 |
| 2013/0172048 A1 * | 7/2013 | Rodriguez et al. | 455/556.1 |
| 2014/0053064 A1 * | 2/2014 | Weber et al. | 715/235 |
| 2014/0160535 A1 * | 6/2014 | Shen et al. | 358/451 |
| 2014/0176440 A1 * | 6/2014 | Dave et al. | 345/163 |
| 2014/0179370 A1 * | 6/2014 | Dave et al. | 455/556.1 |

OTHER PUBLICATIONS

Non-Final Office Action from U.S. Appl. No. 13/725,130, dated Aug. 5, 2014.

* cited by examiner

*Primary Examiner* — Bobbak Safaipour
(74) *Attorney, Agent, or Firm* — Zilka-Kotab, PC

(57) ABSTRACT

A system, process, and computer program product are provided for scanning a document with a hand-held device. An approach for scanning the document includes the steps of sampling one or more values from an array of sensors integrated into a hand-held device, determining whether the device has moved at least a threshold distance, and sampling one or more additional values from the array of sensors.

18 Claims, 7 Drawing Sheets

SYSTEM, PROCESS, AND COMPUTER PROGRAM PRODUCT FOR IMPLEMENTING A DOCUMENT SCANNER IN A HAND-HELD DEVICE

FIELD OF THE INVENTION

The present invention relates to an electronic hand-held device, and more particularly to a hand-held device with integrated electronic hardware.

BACKGROUND

Mobile phones have become ubiquitous in today's digital world. Many people rely on their mobile phone to perform a whole host of varying tasks such as making phone calls, checking email, capturing digital photographs and digital video, reading news on the Internet, playing games, and so forth. The mobile phone has become the Swiss Army knife of hand-held electronics.

Still, the range of tasks that can be performed with today's smart phones (e.g., the Apple™ iPhone, or Google™ Android-based phones) is limited to the hardware supplied with the phones. For example, most phones today come with an integrated CMOS (complementary metal-oxide semiconductor) image sensor to capture pictures or video. Some phones may include a flash device (e.g., an LED flash module) to illuminate a scene. Further, many phones have internal accelerometers or gyroscopes that provide feedback about the motion of the phone. While these and other sensors enable a wide range of applications to be implemented in software on these phones, some applications require hardware that is not readily available within any existing mobile hand-held devices. Thus, there is a need for addressing this issue and/or other issues associated with the prior art.

SUMMARY

A system, process, and computer program product are provided for scanning a document with a hand-held device. An approach for scanning the document includes the steps of sampling one or more values from an array of sensors integrated into a hand-held device, determining whether the device has moved at least a threshold distance, and sampling one or more additional values from the array of sensors.

DETAILED DESCRIPTION

One example application that existing hardware integrated in a hand-held device is not suited to perform is scanning documents. In order to scan a document, most users resort to taking a photograph of a document with the integrated CMOS image sensor. However, the photograph needs to be taken from sufficient distance to capture the entire extents of the document. From such a distance, the contents of the document may not be captured at sufficient resolution to generate a high-quality reproduction of the document. In addition, photographs of the document are typically poor because the quality of the photograph is heavily dependent on the ambient and direct lighting conditions. This disclosure describes a hand-held device, such as a mobile phone, that includes integrated sensors that make applications like scanning a document more efficient and produce better results.

Figure 1A:
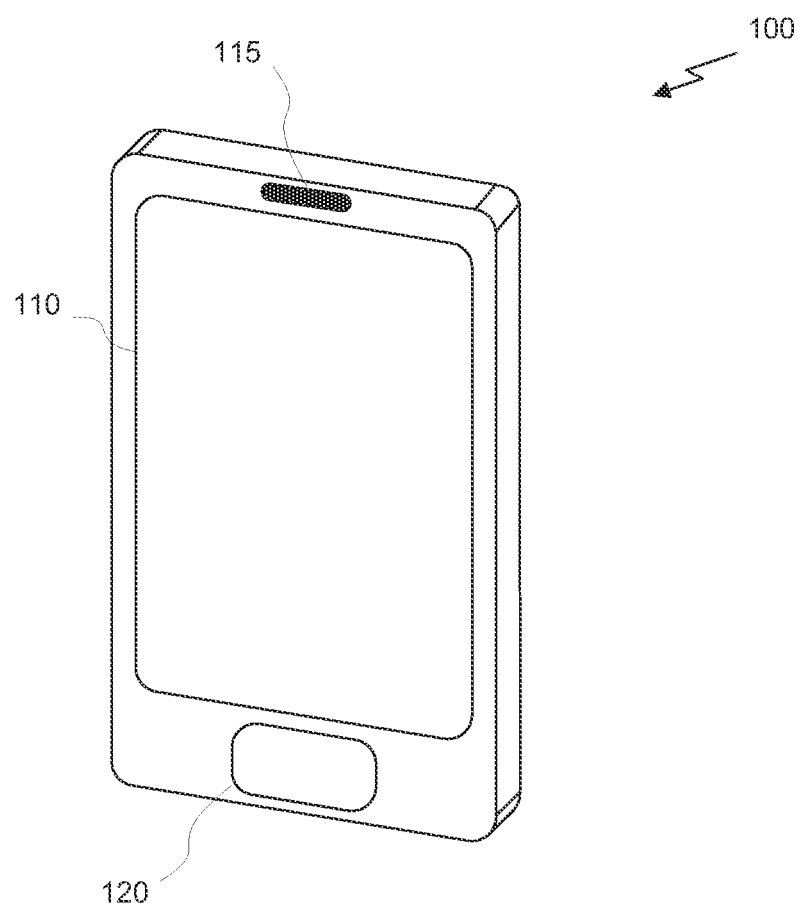
FIGS. 1A & 1B illustrate a hand-held device with integrated sensors, in accordance with one embodiment.
Figure 1B:
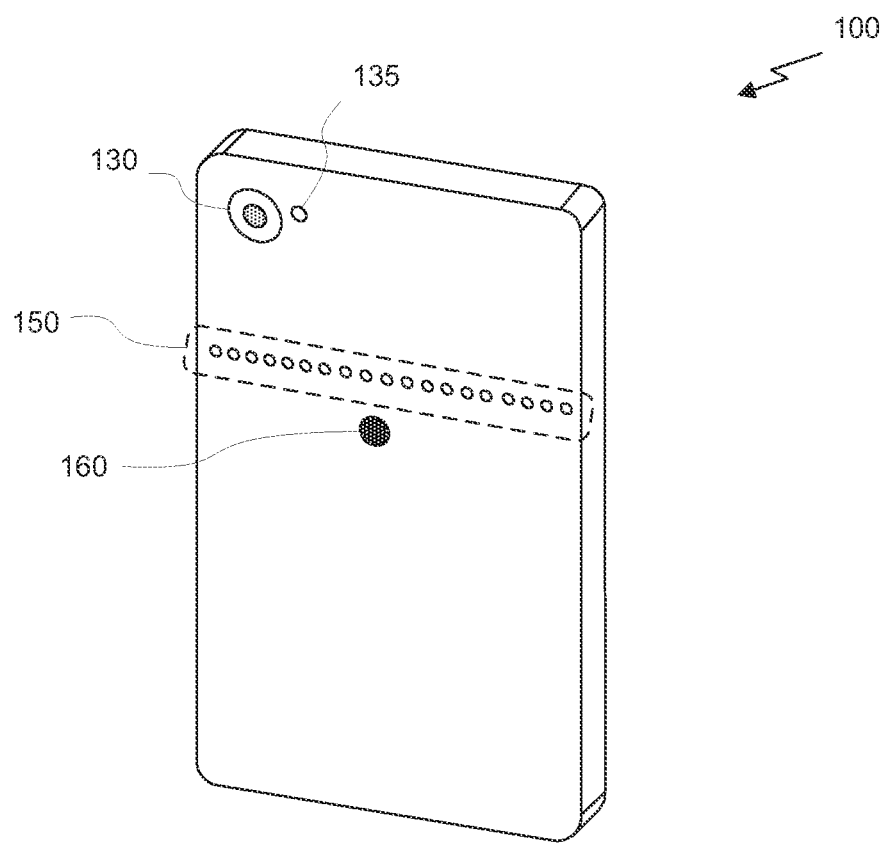

FIGS. 1A & 1B illustrate a hand-held device 100 with integrated sensors, in accordance with one embodiment. The hand-held device 100 may be, but is not limited to, a mobile phone, digital music player, digital camera, or the like. FIG. 1A shows a front side of the device 100 and FIG. 1B shows a rear side of the device 100. As shown in FIG. 1A, the device 100 includes a display device 110 such as an LCD (Liquid Crystal Display) screen, a user interface button 120, and a speaker 115. In one embodiment, the display device 110 is touch-sensitive and can accept user input at a surface of the display 110, such as with a capacitive touchscreen panel. The display device 110 may be configured to display a graphical user interface (GUI) that enables a user to interact with various features of the device 100.

As shown in FIG. 1B, the device 100 includes a camera assembly 130 that includes an image sensor. The image sensor may be a CMOS type image sensor or a CCD (charge-coupled device) image sensor. The device 100 also includes a flash device 135, such as a LED (light emitting diode). The flash device 135 may be discharged to provide a bright light to illuminate a scene captured by the image sensor.

In one embodiment, the device 100 includes an array of CCD sensors 150 located on the back surface of the device 100. The array of CCD sensors 150 may be a one-dimensional array comprising a row of sensors. As shown in FIG. 1B, the array of CCD sensors 150 is oriented horizontally across substantially the entire width of the rear surface of the device 100. The sensors are equally spaced with a uniform distance between each sensor. The distance may correspond to a horizontal resolution of a raw image data captured by sampling the array of CCD sensors 150. In another embodiment, the array of CCD sensors 150 may be a two-dimensional array comprising two or more rows of sensors. The device 100 may include an application that is configured to sample the charge accumulated on each of the CCD sensors to determine a corresponding intensity value for a pixel associated the CCD sensor. In yet another embodiment, the sensors may be other types of sensors such as CMOS sensors.

In one embodiment, the device 100 also includes an array of LED flash devices (not explicitly shown) positioned proximate to the array of CCD sensors 150. The array of LED flash devices may be discharged proximate to the time that the array of CCD sensors 150 are sampled to illuminate a document at a location proximate to the array of CCD sensors 150. In one embodiment, each sensor in the array of CCD sensors 150 is associated with a corresponding LED flash device located proximate to the sensor. In another embodiment, a row of LED flash devices may be located above one or more rows of the array of CCD sensors 150.

The device 100 also includes a position sensor 160. In one embodiment, the position sensor 160 is an optical sensor that includes a red LED diode, or the like, and receiver electronics that detect the reflection of the light on a surface and track the motion of the device. In another embodiment, the position sensor 160 is a laser sensor that is similar to the optical sensor, except the laser sensor includes a diode that emits a laser outside the visible spectrum. The laser sensor may be more sensitive than the optical sensor and provide better resolution of motion.

In other embodiments, the device 100 may also include gyroscopes and/or accelerometers within the internal electronic components of the device 100, The gyroscopes and/or accelerometers may augment the motions signals detected by position sensor 160 to further provide better resolution of motion. In yet other embodiments, device 100 may include gyroscopes and/or accelerometers in lieu of the position sensor 160, where the gyroscopes and/or accelerometers provide the signals for tracking the motion of the device 100.

A user may scan a document using the device 100 by placing the device, rear side down, on top of a document the user would like to scan. A user may begin scanning by pressing the user interface button 120 or by touching a GUI element displayed on display device 110. The device 100 samples the array of CCD sensors 150 to capture a plurality of pixels for a portion of the image. The user may then move the device 100 down the length of the document. The position sensor 160 (and/or the gyroscope/accelerometers) tracks the motion of the device 100. Once the device 100 has moved a distance equal to the width of a pixel, the device 100 samples the array of CCD sensors 150 to capture a plurality of pixels for another portion of the image. The device 100 continues to capture pixels for the image, indexing the location of each of the captured pixels by tracking the motion of the device 100 and associating the location of the array of CCD sensors 150 to the relative location of the document. Once the user has moved the device 100 to the bottom of the document, the user moves the device 100 horizontally by a distance less than the width of the device, and begins moving the device 100 up the length of the document, capturing additional pixels that represent portions of the document. The user may continue to scan the document in this manner until the entire extents of the document have been captured. The application may terminate the scan when the user lifts the device 100 off the document, as sensed by the position sensor 160 (and/or gyroscopes/accelerometers), or when the user otherwise indicates that the scan is complete such as by pressing the user interface button 120 or by touching a GUI element displayed on display device 110.

Figure 2:
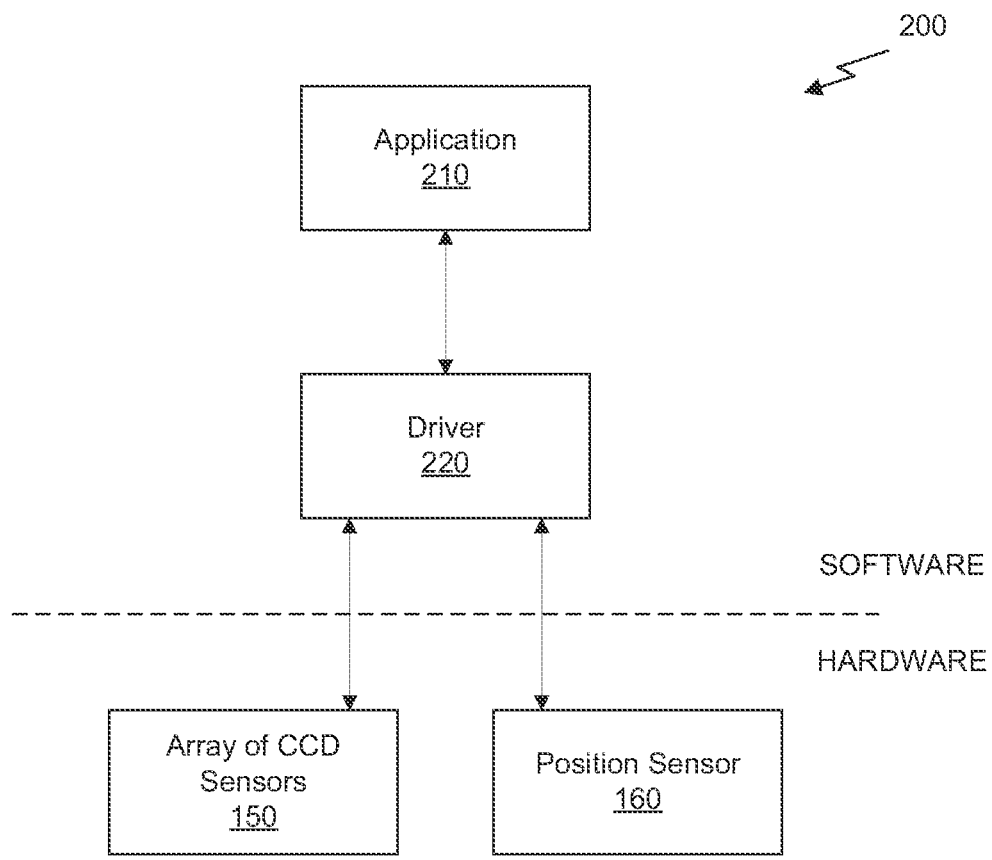
FIG. 2 illustrates a system for configuring a hand-held device to scan a document, in accordance with one embodiment.

FIG. 2 illustrates a system 200 for configuring a hand-held device 100 to scan a document, in accordance with one embodiment. As shown in FIG. 2, the system 200 includes software for configuring hardware to scan a document. The system 200 includes an application 210 and a driver 220. The driver 220 may be part of an operating system (not shown) configured to manage the operation of software on device 100. In one embodiment, the driver 220 is configured to interact with one or more hardware units, such as the array of CCD sensors 150 or the position sensor 160. The driver 220 implements an application programming interface (API) that provides an abstraction layer to one or more applications such as application 210. The application 210 may include instructions that call the methods defined by the API to enable the application to sample the values of the array of CCD sensors 150 or the position sensor 160.

In one embodiment, the application 210 includes a GUI that displays one or more GUI elements on display 110 of the device 100. The GUI may include a GUI element that enables a user to begin scanning a document to generate a digital image of the document. When the user touches the GUI element, the application 210, via the API implemented by driver 220, samples one or more values of the array of CCD sensors 150. The application 210 may process the sampled values to generate pixel data for the digital image, storing the pixel data at locations in a two-dimensional array associated with the position of the device 100. The two-dimensional array may represent the pixels of the digital image. The application 210, via the API implemented by the driver 220, polls the position sensor 160 at a sampling frequency such to determine whether the user has moved the device by a threshold distance. Alternately, the position sensor 160 may indicate to the driver 220 (e.g., via some type of communication protocol) whenever the position sensor detects that the device 100 has moved by a threshold distance. In one embodiment, the threshold distance represents the width of a pixel of the digital image to be generated by the application 210. Once the device 100 has moved by at least the threshold distance, the application 210, via the API implemented by the driver 220, samples one or more additional values of the array of CCD sensors 150. The application 210 may process the additional sampled values to generate additional pixel data for the digital image, storing the additional pixel data at different locations in the two-dimensional array associated with the new position of the device.

In one embodiment, the application 210 processes the sampled values by interpolating the sampled values based on the position of the device 100. For example, the location of the device 100 at the time the array of CCD sensors 150 is sampled may not correspond to an exact location of a pixel in the digital image. In other words, rather than sampling the array of CCD sensors 150 when the device 100 has moved by an amount equal to the width of a pixel, the application 210 may sample the array of CCD sensors 150 when the device 100 has moved 1.3×the width of a pixel. Therefore, the application 210 may be configured to interpolate the sampled values by interpolating two or more sampled values to estimate the sampled value at a location corresponding to a pixel of the digital image. In one embodiment, the application 210 may be configured to sample multiple values for each pixel of the digital image. In other words, the threshold distance at which the application 210 is configured to sample the array of CCD sensors 150 may be less than the width of a pixel (e.g., one quarter the width of a pixel), which enables the sampled values to have a higher resolution than the digital image, that can reduce aliasing effects.

Figure 3:
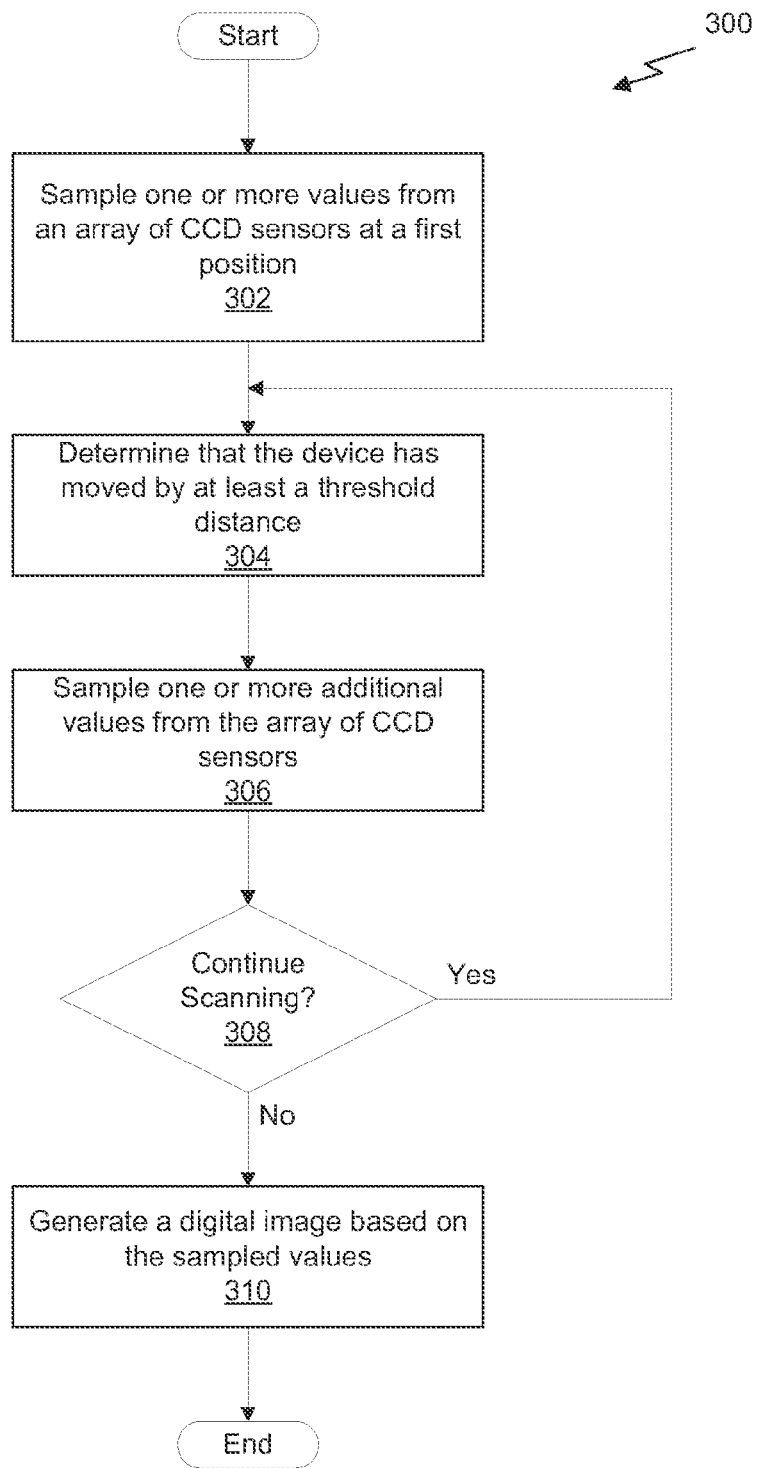
FIG. 3 illustrates a flowchart of a method for sampling a document with a hand-held device, in accordance with one embodiment.

FIG. 3 illustrates a flowchart of a method 300 for sampling a document with a hand-held device 100, in accordance with one embodiment. At step 302, an application 210 samples one or more values from an array of CCD sensors 150 at a first position of the device 100. At step 304, the application 210 determines whether the device 100 has moved by at least a threshold distance. If the device 100 has not moved by at least the threshold distance, then the application 210 waits a period of time before determining whether the device 100 has moved by at least the threshold distance. However, if the device 100 has moved by at least the threshold distance, then, at step 306, the application 210 samples one or more additional values from the array of CCD sensors 150 at a new position of the device 100. At step 308, the application 210 determines whether to continue scanning the document. In one embodiment, the application 210 determines whether the user has indicated, via a user interface button 120 or a GUI element, that scanning is complete. If the application 210 determines that scanning should continue, then method 300 returns to step 304, where the application 210 waits for the device 100 to move by at least the threshold distance. However, if application 210 determines that scanning is complete, then, at step 310, the application 210 generates a digital image based on the sampled values. In one embodiment, the application 210 encodes the pixel data stored in a two-dimensional array according to a digital image format such as JPEG (Joint Pictures Expert Group) and stores the digital image in a memory of the device 100.

In one embodiment, the application 210 opens a wireless communications channel with an external display device such as a high definition television (HDTV) with built-in Wi-Fi capabilities. As pixels are scanned by the device 100, the application 210 transmits pixel data to the HDTV to be displayed on the display of the HDTV while the scan is in process, It will be appreciated that the external display device may be any display device capable of receiving pixel data through a wireless communications channel established by the device 100. The external display device could be a computer monitor, a tablet computer such as an Apple® iPad, an HDTV, or some other type of display device.

Figure 4:
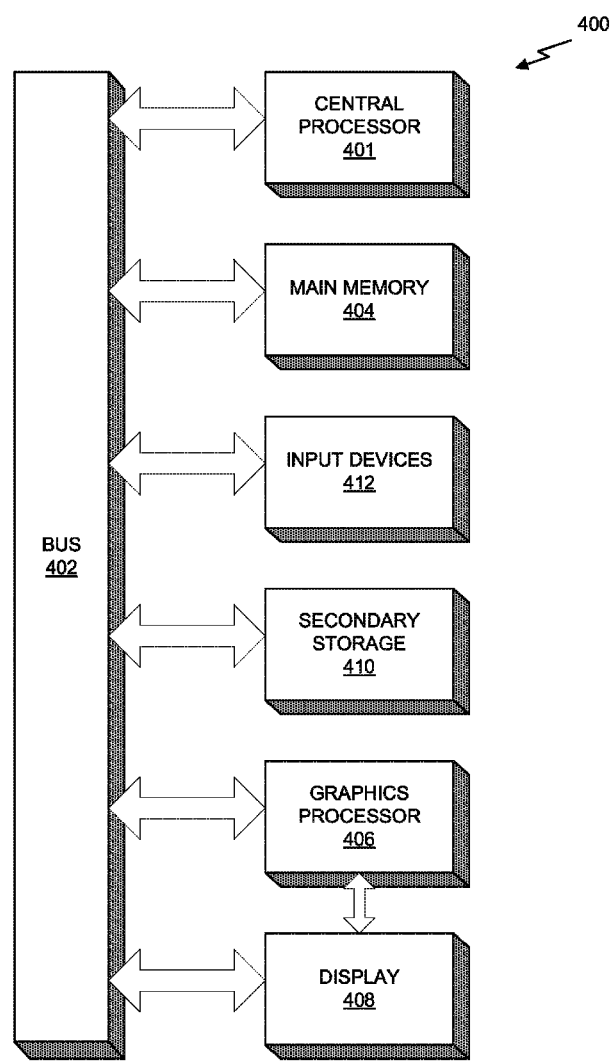
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one central processor 401 that is connected to a communication bus 402, The communication bus 402 may be implemented using any suitable protocol, such as PCI (Peripheral Component Interconnect), PCI-Express, AGP (Accelerated Graphics Port), HyperTransport, or any other bus or point-to-point communication protocol(s). The system 400 also includes a main memory 404. Control logic (software) and data are stored in the main memory 404 which may take the form of random access memory (RAM).

The system 400 also includes input devices 412, a graphics processor 406, and a display 408, i.e. a LCD (liquid crystal display), LED (light emitting diode), or the like. User input may be received from the input devices 412, e.g., keyboard, mouse, touchpad, microphone, and the like. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, digital versatile disk (UM) drive, recording device, universal serial bus (USB) flash memory. The removable storage drive reads from and/or writes to a removable storage unit in a well-known manner.

Computer programs, or computer control logic algorithms, may be stored in the main memory 404 and/or the secondary storage 410. Such computer programs, when executed, enable the system 400 to perform various functions. The memory 404, the storage 410, and/or any other storage are possible examples of computer-readable media.

In one embodiment, the architecture and/or functionality of the various previous figures may be implemented in the context of the central processor 401, the graphics processor 406, an integrated circuit (not shown) that is capable of at least a portion of the capabilities of both the central processor 401 and the graphics processor 406, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of various devices including, but not limited to, a personal digital assistant (PDA) device, a mobile phone device, etc.

Further, while not shown, the system 400 may be coupled to a network (e.g., a telecommunications network, local area network (LAN), wireless network, wide area network (WAN) such as the Internet, peer-to-peer network, cable network, or the like) for communication purposes.

It will be appreciated that the application 210 and driver 220 may be executed by the CPU 401 and that the hardware units such as the array of CCD sensors 150 and the position sensor 160 may be connected to the communications bus 402 and in communication with the CPU 401 there through. In one embodiment, the application 210 may be at least partially implemented as one or more threads executing on the graphics processor 406. For example, a plurality of threads, each thread corresponding to a particular sensor of the array of CCD sensors 150, may be executed in the graphics processor 406 to generate pixel data for the digital image. The pixel data may be stored in a frame buffer in memory 404 until scanning is complete, at which point the graphics processor 406 generates the digital image for storage in memory 404.

Figure 5:
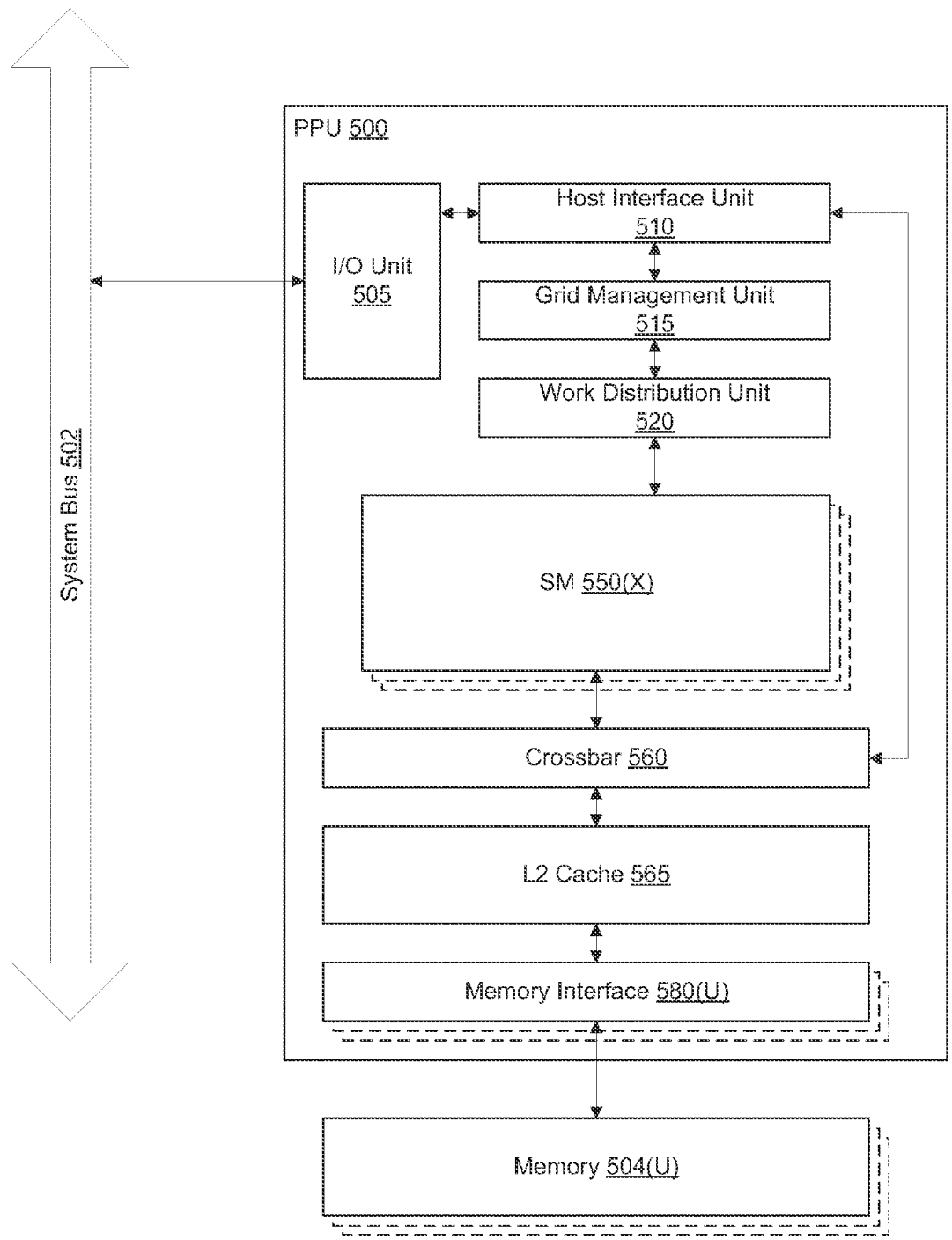
FIG. 5 illustrates a parallel processing unit (PPU), according to one embodiment.

FIG. 5 illustrates a parallel processing unit (PPU) 500, according to one embodiment. While a parallel processor is provided herein as an example of the PPU 500, it should be strongly noted that such processor is set forth for illustrative purposes only, and any processor may be employed to supplement and/or substitute for the same. In one embodiment, the PPU 500 is configured to execute a plurality of threads concurrently in two or more streaming multi-processors (SMs) 550. A thread (i.e., a thread of execution) is an instantiation of a set of instructions executing within a particular SM 550. Each SM 550, described below in more detail in conjunction with FIG. 6, may include, but is not limited to, one or more processing cores, one or more load/store units (LSUs), a level-one (L1) cache, shared memory, and the like.

In one embodiment, the PPU 500 includes an input/output (110) unit 505 configured to transmit and receive communications (i.e., commands, data, etc.) from a central processing unit (CPU) (not shown) over the system bus 502. The I/O unit 505 may implement a Peripheral Component Interconnect Express (PCIe) interface for communications over a PCIe bus. In alternative embodiments, the I/O unit 505 may implement other types of well-known bus interfaces.

The PPU 500 also includes a host interface unit 510 that decodes the commands and transmits the commands to the grid management unit 515 or other units of the PPU 500 (e.g., memory interface 580) as the commands may specify. The host interface unit 510 is configured to route communications between and among the various logical units of the PPU 500.

In one embodiment, a program encoded as a command stream is written to a buffer by the CPU. The buffer is a region in memory, e.g., memory 504 or system memory, that is accessible (i.e., read/write) by both the CPU and the PPU 500. The CPU writes the command stream to the buffer and then transmits a pointer to the start of the command stream to the PPU 500. The host interface unit 510 provides the grid management unit (OMIT) 515 with pointers to one or more streams. The GMU 515 selects one or more streams and is configured to organize the selected streams as a pool of pending grids. The pool of pending grids may include new grids that have not yet been selected for execution and grids that have been partially executed and have been suspended.

A work distribution unit 520 that is coupled between the GMU 515 and the SMs 550 manages a pool of active grids, selecting and dispatching active grids for execution by the SMs 550. Pending grids are transferred to the active grid pool by the GMU 515 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 520. In addition to receiving grids from the host interface unit 510 and the work distribution unit 520, the GMU 510 also receives grids that are dynamically generated by the SMs 550 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 500. An application may include instructions (i.e., API calls) that cause the driver kernel to generate one or more grids for execution. In one embodiment, the PPU 500 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 500 comprises X SMs 550 (X). For example, the PPU 100 may include 15 distinct SMs 550. Each SM 550 is multi-threaded and configured to execute a plurality of threads (e.g., 32 threads) from a particular thread block concurrently. Each of the SMs 550 is connected to a level-two (L2) cache 565 via a crossbar 560 (or other type of interconnect network). The L2 cache 565 is connected to one or more memory interfaces 580, Memory interfaces 580 implement 16, 32, 64, 128-bit data buses, or the like, for high-speed data transfer. In one embodiment, the PPU 500 comprises U memory interfaces 580(U), where each memory interface 580(U) is connected to a corresponding memory device 504(U). For example, PHI 500 may be connected to up to 6 memory devices 504, such as graphics double-data-rate, version 5, synchronous dynamic random access memory (GDDR5 SDRAM), In one embodiment, the PPU 500 implements a multi-level memory hierarchy. The memory 504 is located off-chip in SDRAM coupled to the PTV 500. Data from the memory 504 may be fetched and stored in the L2 cache 565, which is located on-chip and is shared between the various SMs 550, In one embodiment, each of the SMs 550 also implements an L1 cache. The L1 cache is private memory that is dedicated to a particular SM 550. Each of the L1 caches is coupled to the shared L2 cache 565. Data from the L2 cache 565 may be fetched and stored in each of the L1 caches for processing in the functional units of the SMs 550.

In one embodiment, the PPU 500 comprises a graphics processing unit (GPU). The PRI 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 500 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 515 may configure one or more SMs 550 to execute a vertex shader program that processes a number of vertices defined by the model data. In one embodiment, the GMU 515 may configure different SMs 550 to execute different shader programs concurrently. For example, a first subset of SMs 550 may be configured to execute a vertex shader program while a second subset of SMs 550 may be configured to execute a pixel shader program. The first subset of SMs 550 processes vertex data to produce processed vertex data and writes the processed vertex data to the L2 cache 565 and/or the memory 504. After the processed vertex data is rasterized (i.e., transformed from three-dimensional data into two-dimensional data in screen space) to produce fragment data, the second subset of SMs 550 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 500 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 500 is embodied on a single semiconductor substrate. In another embodiment, the PPU 500 is included in a system-on-a-chip (SoC) along with one or more other logic units such as a reduced instruction set computer (RISC) CPU, a memory management unit (MMU), a digital-to-analog converter (DAC), and the like. For example, PPU 500 may be included in system 400 of FIG. 4.

In one embodiment, the PPU 500 may he included on a graphics card that includes one or more memory devices 504 such as GDDR5 SDRAM. The graphics card may be configured to interface with a PCIe slot on a motherboard of a desktop computer that includes, e.g., a northbridge chipset and a southbridge chipset. In yet another embodiment, the PPU 500 may he an integrated graphics processing unit (iGPU) included in the chipset (i.e., Northbridge) of the motherboard.

Figure 6:
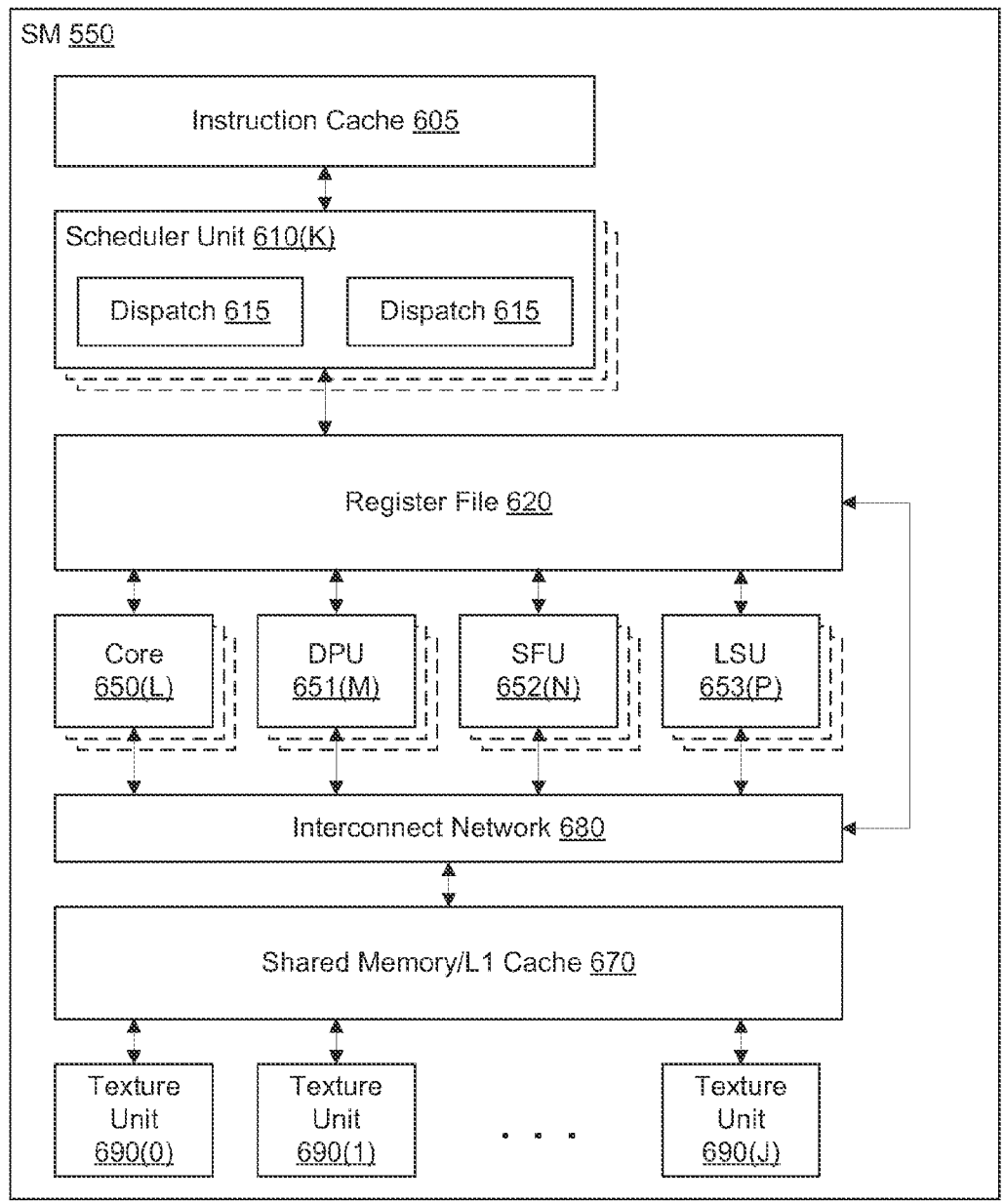
FIG. 6 illustrates the streaming multi-processor of FIG. 5, according to one embodiment.

FIG. 6 illustrates t le streaming multi-processor 550 of FIG. 5, according to one embodiment. As shown in FIG. 6, the SM 550 includes an instruction cache 605, one or more scheduler units 610, a register file 620, one or more processing cores 650, one or more double precision units (DPUs) 651, one or more special function units (SRN) 652, one or more load/store units (LSUs) 653, an interconnect network 680, a shared memory/L1 cache 670, and one or more texture units 690.

As described above, the work distribution unit 520 dispatches active grids for execution on one or more SMs 550 of the PPU 500. The scheduler unit 610 receives the grids from the work distribution unit 520 and manages instruction scheduling for one or more thread blocks of each active grid. The scheduler unit 610 schedules threads for execution in groups of parallel threads, where each group is called a warp. In one embodiment, each warp includes 32 threads. The scheduler unit 610 may manage a plurality of different thread blocks, allocating the thread blocks to warps for execution and then scheduling instructions from the plurality of different warps on the various functional units (i.e., cores 650, DPUs 651, SFUs 652, and LSUs 653) during each clock cycle.

In one embodiment, each scheduler unit 610 includes one or more instruction dispatch units 615. Each dispatch unit 615 is configured to transmit instructions to one or more of the functional units. In the embodiment shown in FIG. 6, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each SM 650 includes a register file 620 that provides a set of registers for the functional units of the SM 650. In one embodiment, the register file 620 is divided between each of the functional units such that each functional unit is allocated a dedicated portion of the register file 620. In another embodiment, the register file 620 is divided between the different warps being executed by the SM 550. The register file 620 provides temporary storage for operands connected to the data paths of the functional units.

Each SM 550 comprises L processing cores 650. In one embodiment, the SM 550 includes a large number (e.g., 192, etc.) of distinct processing cores 650. Each core 650 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 550 also comprises M DPUs 651 that implement double-precision floating point arithmetic, N SFUs 652 that perform special functions (e.g., copy rectangle, pixel blending operations, and the like), and P LSUs 653 that implement load and store operations between the shared memory/L1 cache 670 and the register file 620. In one embodiment, the SM 550 includes 64 DPUs 651, 32 SFUs 652, and 32 LSUs 653.

Each SM 550 includes an interconnect network 680 that connects each of the functional units to the register file 620 and the shared memory/L1 cache 670. In one embodiment, the interconnect network 680 is a crossbar that can be configured to connect any of the functional units to any of the registers in the register file 620 or the memory locations in shared memory/L1 cache 670.

In one embodiment, the SM 550 is implemented within a GPU. In such an embodiment, the SM 550 comprises J texture units 690. The texture units 690 are configured to load texture maps (i.e., a 2D array of texels) from the memory 504 and sample the texture maps to produce sampled texture values for use in shade programs. The texture units 690 implement texture operations such as anti-aliasing operations using mip-maps (i.e., texture maps of varying levels of detail). In one embodiment, the SM 550 includes 16 texture units 690.

The PPU 500 described above may be configured to perform highly parallel computations much faster than conventional CPUs. Parallel computing has advantages in graphics processing, data compression, biometrics, stream processing algorithms, and the like.

In one embodiment, PPU 500 may be implemented within system 400 and configured to execute at least a portion of application 210. A plurality of threads may be generated and executed on PPU 500 to generate pixel data for the digital image. The threads may be executed by one or more SMs 550 of PPU 500.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   sampling one or more values from an array of sensors integrated into a hand-held device, wherein the hand-held device is a mobile phone that includes an application and a driver in a memory, and wherein the sampling is triggered by the application via an application programming interface (API) implemented by the driver;
   determining whether the hand-held device has moved at least a threshold distance, wherein the application polls a position sensor via, the API, to determine a distance moved by the hand-held device; and
   if the device has moved at least the threshold distance, then sampling one or more additional values from the array of sensors, or
   if the device has not moved at least the threshold distance, then waiting for a period of time before determining whether the device has moved at least the threshold distance.

2. The method of claim 1, further comprising generating a digital image based on the one or more sampled values and the one or more additional sampled values.

3. The method of claim 1, further comprising:
   determining whether to continue scanning a document; and
   if the document should continue to be scanned, then determining whether the device has moved by at least the threshold distance and sampling one or more additional values from the array of sensors, or
   if the document should not continue to be scanned, then generating a digital image based on the one or more sampled values and the one or more additional sampled values.

4. The method of claim 1, wherein the array of sensors comprises a plurality of CCD sensors.

5. The method of claim 4, wherein the array of sensors includes two or more rows of CCD sensors, and wherein each row of includes two or more CCD sensors.

6. The method of claim 4, wherein the array of sensors substantially spans the entire width of a rear surface of the hand-held device.

7. A non-transitory computer-readable storage medium storing instructions that, when executed by a processor, cause the processor to perform steps comprising:
   sampling one or more values from an array of sensors integrated into a hand-held device, wherein the hand-held device is a mobile phone that includes an application and a driver in a memory, and wherein the sampling is triggered by the application via an application programming interface (API) implemented by the driver;

determining whether the hand-held device has moved at least a threshold distance, wherein the application polls a position sensor via, the API, to determine a distance moved by the hand-held device; and if the device has moved at least the threshold distance, then sampling one or more additional values from the array of sensors, or if the device has not moved at least the threshold distance, then waiting for a period of time before determining whether the device has moved at least the threshold distance.

8. The non-transitory computer-readable storage medium of claim 7, the steps further comprising:

generating a digital image based on the one or more sampled values and the one or more additional sampled values.

9. The non-transitory computer-readable storage medium of claim 7, the steps further comprising:

determining whether to continue scanning a document; and if the document should continue to be scanned, then determining whether the device has moved by at least the threshold distance and sampling one or more additional values from the array of sensors, or if the document should not continue to be scanned, then generating a digital image based on the one or more sampled values and the one or more additional sampled values.

10. A system comprising:

an array of sensors integrated into a hand-held device, wherein the hand-held device is a mobile phone;

a position sensor integrated into the device;

a memory that includes an application and a driver; and a processor coupled to the array of sensors, the position sensor, and the memory, the processor configured to:

sample one or more values from the array of sensors, wherein the sampling is triggered by the application via an application programming interface (API) implemented by the driver, determine whether the hand-held device has moved at least a threshold distance, wherein the application polls a position sensor via, the API, to determine a distance moved by the hand-held device; and if the device has moved at least the threshold distance, then sample one or more additional values from the array of sensors, or if the device has not moved at least the threshold distance, then waiting for a period of time before determining whether the device has moved at least the threshold distance.

11. The system of claim 10, wherein the array of sensors comprises a plurality of CCD sensors.

12. The system of claim 11, wherein the array of sensors includes two or more rows of CCD sensors, and wherein each row of includes two or more CCD sensors.

13. The system of claim 11, wherein the array of sensors substantially spans the entire width of a rear surface of the hand-held device.

14. The system of claim 10, wherein the position sensor is an optical position sensor.

15. The system of claim 10, further comprising an array of LED flash devices integrated in the hand-held device proximate to the array of sensors.

16. The system of claim 10, wherein the processor is further configured to generate a digital image based on the one or more sampled values and the one or more additional sampled values.

17. The system of claim 10, further comprising a graphics processor configured to generate pixel data for a digital image based on the one or more sampled values.

18. The system of claim 10, further comprising an external display device configured to receive pixel data from the processor via a wireless communications channel established between the processor and the external display device, wherein the processor generates pixel data for display on the external display device in response to sampling the one or more values and the one or more additional values from the array of sensors.

* * * * *